United States Patent
Ohara et al.

(10) Patent No.: US 8,882,148 B2
(45) Date of Patent: *Nov. 11, 2014

(54) STEERING SYSTEM (75) Inventors: Yoshihide Ohara, Okazaki (JP); Tatsuhiro Yamamoto, Okazaki (JP); Hiroshi Kawakami, Toyota (JP); Toru Suzuki, Seto (JP)

(73) Assignees: JTEKT Corporation, Osaka-shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/978,464

(22) PCT Filed: Jan. 6, 2012

(86) PCT No.: PCT/JP2012/050145
§ 371 (c)(1),
(2), (4) Date: Jul. 5, 2013

(87) PCT Pub. No.: WO2012/093712
PCT Pub. Date: Jul. 12, 2012

(65) Prior Publication Data
US 2013/0305871 A1 Nov. 21, 2013

(30) Foreign Application Priority Data
Jan. 6, 2011 (JP) .................. 2011-001470

(51) Int. Cl.
*B62D 1/187* (2006.01)
*B62D 5/04* (2006.01)
*B62D 1/189* (2006.01)

(52) U.S. Cl.
CPC .............. *B62D 1/187* (2013.01); *B62D 5/0409* (2013.01); *B62D 1/189* (2013.01)
USPC ....................................... 280/775

(58) Field of Classification Search
CPC ........... B62D 1/187; B62D 1/189; B62D 1/18
USPC ................................. 280/775, 779
See application file for complete search history.

(56) References Cited

U.S. PATENT DOCUMENTS 5,743,151 A * 4/1998 Khalifa et al. .................. 74/493
5,992,263 A * 11/1999 Bleuel et al. .................... 74/493

(Continued)

FOREIGN PATENT DOCUMENTS

| JP | Y2-62-18125 | 5/1987 |
|---|---|---|
| JP | Y2-63-4678 | 2/1988 |

(Continued)

*Primary Examiner* — Nicole Verley
(74) *Attorney, Agent, or Firm* — Oliff PLC (57) ABSTRACT

A steering system includes a steering column which supports rotatably a steering shaft to which a steering wheel is connected and a pair of support mechanisms which support the steering column so as to tilt relative to a vehicle body. Each of the support mechanisms includes a support bracket having a column-side fastened portion and a body-side fastened portion, a fulcrum bolt, and a bush. A fastening hole through which a fastening bolt is inserted to fasten the support bracket to a fixed member is formed in the body-side fastened portion. Each of the support mechanisms includes an elastic member which can be compressed in an axial direction of the fulcrum bolt, and the support bracket is configured to oscillate relative to the steering column by the elastic member being compressed.

7 Claims, 7 Drawing Sheets

(56) References Cited

U.S. PATENT DOCUMENTS

| | | | |
|---|---|---|---|
| 6,443,650 B2* | 9/2002 | Ikeda | 403/12 |
| 7,275,458 B2* | 10/2007 | Kinme et al. | 74/493 |
| 7,328,917 B2* | 2/2008 | Sawada et al. | 280/775 |
| 7,360,793 B2 | 4/2008 | Hoshino et al. | |
| 7,607,694 B2* | 10/2009 | Shinohara et al. | 280/775 |
| 7,658,125 B2* | 2/2010 | Inayoshi et al. | 74/493 |
| 7,861,615 B2* | 1/2011 | Harris et al. | 74/493 |
| 8,235,420 B2* | 8/2012 | Moriyama et al. | 280/777 |
| 8,485,554 B2* | 7/2013 | Osuka et al. | 280/777 |
| 8,601,901 B2* | 12/2013 | Ishii et al. | 74/493 |
| 8,651,526 B2* | 2/2014 | Nakamura et al. | 280/777 |
| 8,678,435 B2* | 3/2014 | Sakata | 280/775 |
| 2003/0168843 A1* | 9/2003 | Ryne et al. | 280/779 |
| 2004/0134302 A1* | 7/2004 | Ko et al. | 74/493 |
| 2006/0043722 A1* | 3/2006 | Hoshino et al. | 280/777 |
| 2006/0097501 A1* | 5/2006 | Yoshimoto et al. | 280/777 |
| 2007/0127982 A1* | 6/2007 | Bohlen et al. | 403/119 |
| 2009/0205458 A1* | 8/2009 | Clark et al. | 74/493 |
| 2010/0243368 A1* | 9/2010 | Suzuki | 180/444 |
| 2014/0026707 A1* | 1/2014 | Yokota et al. | 74/493 |

FOREIGN PATENT DOCUMENTS

| | | |
|---|---|---|
| JP | A-2001-315649 | 11/2001 |
| JP | A-2006-62434 | 3/2006 |
| JP | A-2009-113726 | 5/2009 |
| JP | A-2009-113727 | 5/2009 |
| JP | A-2010-137665 | 6/2010 |

* cited by examiner

STEERING SYSTEM

TECHNICAL FIELD

The present invention relates to a steering system for a vehicle.

BACKGROUND ART

Conventionally, there are steering systems which include a tilt function which enables the adjustment of a height-wise position of a steering wheel according to the build of a driver. In steering systems of this type, a steering column which supports a steering shaft rotatably is supported in a sloping fashion on a vehicle body, and changing the sloping angle of the steering column enables the adjustment of the height-wise position of the steering wheel.

As a support construction for the tilt fulcrum portion of the steering column, there is known a support construction in which a steering column is supported on a vehicle body via a pair of support mechanisms which are provided on both sides of the steering column in a transverse direction of the vehicle (for example, refer to Patent Literature 1).

Figure 8:
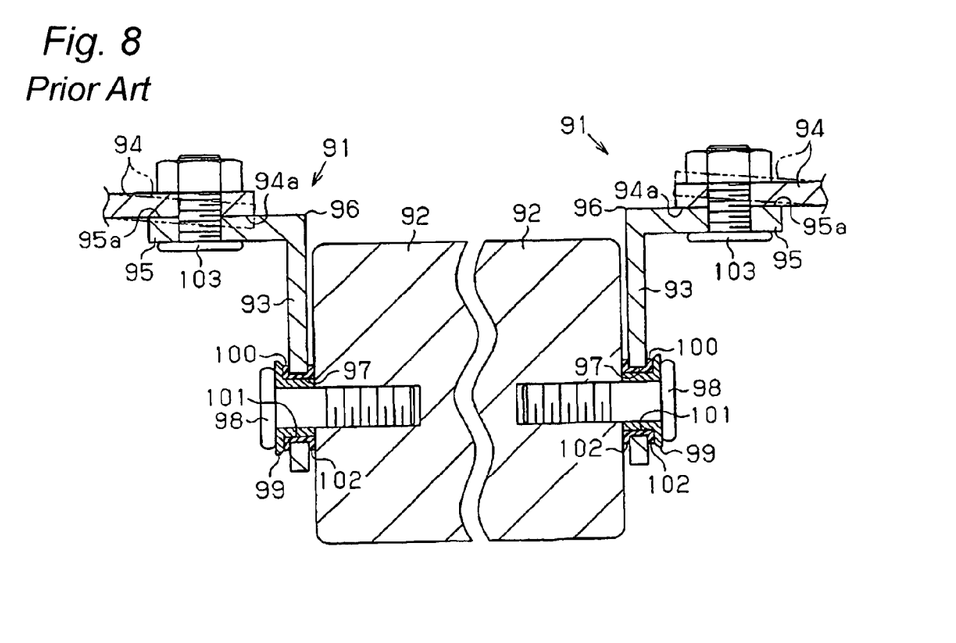
FIG. 8 is an enlarged sectional view of conventional support mechanisms.

In a steering system described in Patent Literature 1, as shown in FIG. 8, each support mechanism 91 includes a substantially L-shaped support bracket 96 which has a column-side fastened portion 93 which is fastened to a steering column 92 in a tilting fashion and a body-side fastened portion 95 which is fastened to a fixed member 94 which is fixed to the vehicle body. Additionally, the support mechanism 91 includes a fulcrum bolt 98 which is inserted through a shaft hole 97 which is formed in the column-side fastened portion 93, a collar 99 which is fitted on the fulcrum bolt 98 and a tubular bush 100 which is interposed between the collar 99 and the shaft hole 97. The bush 100 is formed of a resin material having a superior slidability, and the collar 99 (the fulcrum bolt 98) is inserted therethrough so as to rotate therein. The bush 100 is made up of a round tubular portion 101 and flange portions 102 which are extended radially outwards from axial ends thereof.

Additionally, the support bracket 96 is fastened to the steering column 92 at the column-side fastened portion 93 by the fulcrum bolt 98 and is fastened to the fixed member 94 at the body-side fastened portion 95 by a fastening bolt 103. By this configuration, the steering column 92 is supported by the support mechanisms 91 so as to tilt about the fulcrum bolts 98 relative to the vehicle body.

CITATION LIST

Patent Literature

Patent Literature 1: JP-A-2009-113726

SUMMARY OF INVENTION

Technical Problem

Incidentally, there may be a situation in which when the fixed member 94 is offset from a normal position (a position resulting when no machining error occurs) as indicated by a chain double-dashed line in FIG. 8 due to the machining accuracy or assembling accuracy of the fixed member 94 to the vehicle body, a fastening surface 94a of the fixed member 94 is not parallel to (is in a sloping position relative to) a fastening surface 95a of the body-side fastened member 95 which is disposed in a normal position. In this way, when the fastening surface 94a and the fastening surface 95a are not parallel to each other, in fastening the support bracket 96 to the fixed member 94, the support bracket 96 is deformed, or the tubular portion 101 and the flange portions 102 of the bush 100 are deformed, whereby there may be a situation in which the support bracket 96 oscillates. As a result, the axial force of the fastening bolt 103 is cancelled by stress produced in association with the deformation of the support bracket 96 or the bush 100, whereby the fastening force of the support bracket 96 to the fixed member 94 is weakened. Consequently, the support bracket 96 and the fastening bolt 103 must be designed so as to afford to allow for the negative results associated with the deformation by giving a larger fastening force to the former in view of the reduced axial force and selecting a bolt having a thickness which can withstand the increased fastening force, which has called for an increase in cost.

The invention has been made with a view to solving the problem, and an object thereof is to provide a steering system which can suppress the reduction in axial force of a fastening bolt.

Solution to Problem

With a view to attaining the object, a steering system according to the invention has the following characteristics (1) to (7).

(1) A steering system, comprising a steering column which supports rotatably a steering shaft to which a steering wheel is connected and a pair of support mechanisms which support the steering column so as to tilt relative to a vehicle body, each of the support mechanisms including:

a support bracket having a column-side fastened portion which is fastened to the steering column so as to tilt and a body-side fastened portion which is fastened to a fixed member which is fixed to the vehicle body;

a fulcrum bolt which is inserted through a shaft hole formed in the column-side fastened portion, which performs as a fulcrum when the steering column tilts, and which is used to fasten the column-side fastened portion to the steering column; and a bush which is interposed between the fulcrum bolt and the shaft hole, wherein a fastening hole through which a fastening bolt is inserted to fasten the support bracket to the fixed member is formed in the body-side fastened portion, characterized in that each of the support mechanisms comprises an elastic member which can be compressed in an axial direction of the fulcrum bolt, and the support bracket is configured to oscillate relative to the steering column by the elastic member being compressed.

According to the configuration of (1) above, even when the fixed member is offset from the normal position due to the machining accuracy, in fastening the support bracket to the fixed member, since the support bracket oscillates relative to the steering column by the elastic member being compressed in the axial direction of the fulcrum bolt, it possible to suppress the deformation of the support bracket. Additionally, as this occurs, since the elastic member is compressed in the axial direction, the support bracket can oscillate without deforming the flange portions of the bush as done in the case of the related art configuration. Consequently, it is possible to suppress the reduction in axial force of the fastening bolt, whereby the design which allows for the reduction in axial force is no more necessary, thereby making it possible to realize a reduction in cost.

(2) In the steering system set forth under (1) above, it is preferable that the elastic member which is provided on either of the support mechanisms is disposed on a side of the steering column with respect to the column-side fastened portion, and the elastic member which is provided on the other of the support mechanisms is disposed on a side opposite to the steering column with respect to the column-side fastened portion.

According to the configuration of (2) above, being disposed on the steering column side of the column-side fastened portion, the elastic member which is provided on the one of the support mechanisms biases the steering column towards the other support mechanism. Additionally, being disposed on the opposite side of the column-side fastened portion which is opposite to the steering column side thereof, the elastic member which is provided on the other support mechanism biases the steering column towards the other support mechanism via the fulcrum bolt. Namely, in the configuration above, the steering column is pressed against the other support mechanism (the support bracket). Because of this, even in the event that the respective members that make up the support mechanism wear as a result of use over a long period of time to produce an axial gap between the steering column and each support bracket, the looseness of the steering column can be suppressed.

(3) in the steering system set forth under (1) or (2) above, an inside diameter of the fastening hole is preferably formed larger than an outside diameter of a threaded portion of the fastening bolt.

According to the configuration of (3) above, since the inside diameter of the fastening hole is formed larger than the outside diameter of the threaded portion of the fastening bolt, even in the event that the position of the fastening hole is changed due to the oscillation of the support bracket, the body-side fastened portion can easily be fastened to the fixed member.

(4) In the steering system set forth under (2) or (3), it is preferable that an inside diameter of a fastening hole formed in the support bracket which is provided on either of the support mechanisms is formed larger than an inside diameter of a fastening hole formed in the support bracket which is provided on the other of the support mechanisms.

According to the configuration of (4) above, an assembling position of the steering column (the steering wheel) to the vehicle body is determined based on the position of the fastening hole in the support bracket which is provided on the other support mechanism.

Here, as has been described above, the steering column is pressed against the support bracket which is provided on the other support mechanism, and hence, the steering column is spaced away from the support mechanism which is provided on the one support mechanism. Because of this, the relative position of the support bracket which is provided on the other support mechanism relative to the steering column is made difficult to vary, compared with the support bracket which is provided on the one support mechanism. Consequently, according to the configuration of (4), the accuracy with which the steering column is assembled to the vehicle body can easily be increased.

(5) In the steering system set forth in any of (1) to (4) above, it is preferable that a fastening surface of the body-side fastened portion which oppositely faces the fixed member is formed in a sloping fashion relative to a direction in which the support bracket oscillates about a side opposite to the body-side fastened portion with respect to the column-side fastened portion as a fulcrum relative to a fastening surface of the fixed member which oppositely faces the body-side fastened column, in a plane which is at right angles to the fastening surface.

When the support bracket oscillates about the side of the column-side fastened portion which is opposite to the body-side fastened portion side thereof as the fulcrum in the plane which is at right angles to the fastening surface, compared with when the support bracket oscillates about the body-side fastened portion side of the column-side fastened portion as the fulcrum, the position of the fastening hole which is formed in the body-side fastened portion is changed largely due to the oscillation of the support bracket.

In this respect, according to the configuration of (5), the fastening surface of the body-side fastened portion is formed in the sloping fashion relative to the direction in which the support bracket oscillates about the side of the column-side fastened portion which is opposite to the body-side fastened portion side thereof as the fulcrum relative to the fastening surface of the fixed member. Because of this, in fastening the support bracket to the fixed member, the oscillation of the support bracket about the side of the column-side fastened portion which is opposite to the body-side fastened portion side thereof as the fulcrum can be suppressed, and therefore, it is possible to suppress the occurrence of a situation in which the assemblage of the steering column is made difficult due to the position of the fastening hole being offset largely by the oscillation of the support bracket.

(6) In the steering system set forth in any of (1) to (5) above, it is preferable that the bush has a round tubular portion and a flange portion which is extended radially outwards from the tubular portion, that the flange portion is held between the column-side fastened portion and an oppositely facing portion which oppositely faces the column-side fastened portion in the axial direction, that the oppositely facing portion is formed so as not to project further in a direction which is at right angles to the axial direction than the column-side fastened portion, and that the flange portion is formed so as not to project further in the direction which is at right angles to the axial direction than the oppositely facing portion.

According to the configuration of (6) above, since the flange portion does not project further in the direction which is at right angles to the axial direction of the fulcrum bolt than the oppositely facing portion, when the support bracket oscillates, an end portion of the oppositely facing portion can be prevented from biting into the flange portion, thereby making it possible to suppress the application of an excessive load to the flange portion.

(7) In the steering system set forth in any of (1) to (6) above, it is preferable that the support bracket is formed so that a movement of the fulcrum bolt in a direction in which the fulcrum bolt is screwed off is restricted by the fastening bolt.

According to the configuration of (7) above, even in the event that the fulcrum bolt is loosened due to the steering column being tilted repeatedly, since the movement of the fulcrum bolt in the direction in which the fulcrum bolt is screwed off is restricted, it is possible to prevent the fulcrum bolt from being screwed off to fall.

Advantageous Effects of Invention

According to the invention, it is possible to provide the steering system which can suppress the reduction in axial force of the fastening bolt.

DESCRIPTION OF EMBODIMENTS

Hereinafter, one embodiment into which the invention is embodied will be described by reference to the drawings.

Figure 1:
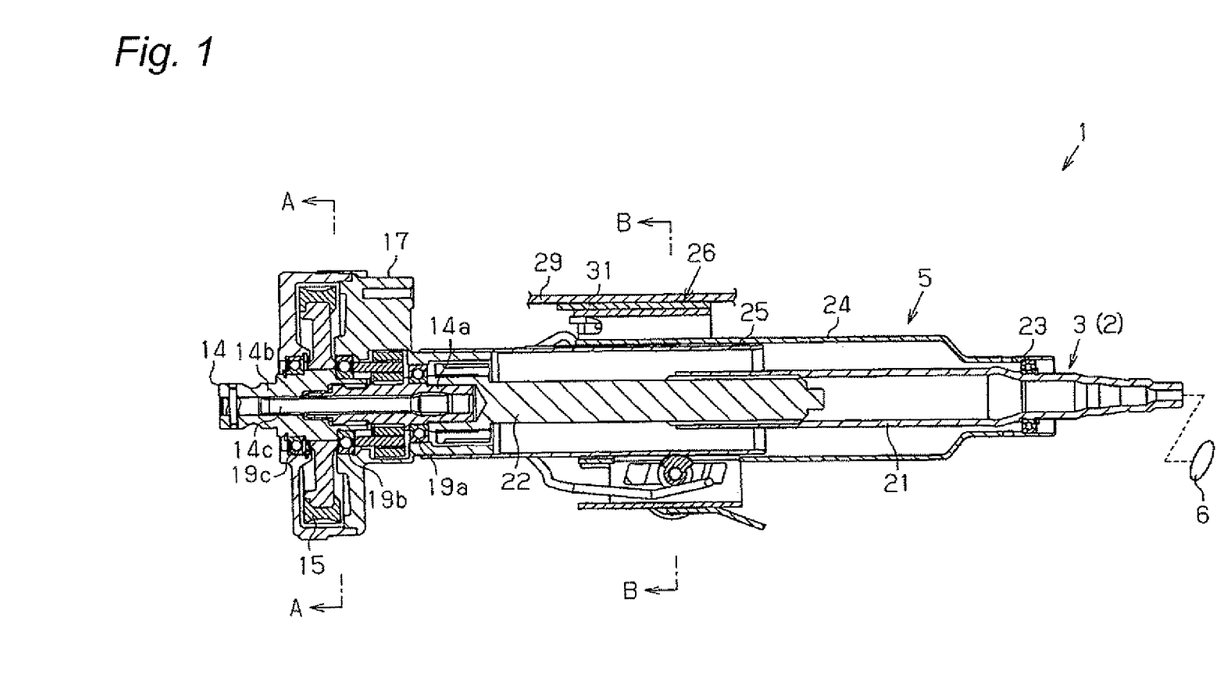
FIG. 1 is a sectional view of part of a steering system according to an embodiment of the invention which lies near a steering column.

As shown in FIG. 1, in a steering system 1, a column shaft 3 which makes up a steering shaft 2 is accommodated rotatably in a steering column 5. A steering wheel 6 is fixed to an end portion (a right end portion in FIG. 1) of the column shaft 3 which is situated to face the rear of the vehicle. On the other hand, an intermediate shaft is connected to an end portion (a left end portion in FIG. 1) of the column shaft 3 which is situated to face the front of the vehicle via a universal joint (both the intermediate shaft and the universal joint being not shown). Thus, rotational and steering torque associated with a steering operation is transmitted to a steering gear mechanism such as a rack and pinion mechanism which changes the steering angles of steered wheels. Additionally, the steering shaft 2 is mounted on the vehicle in a sloping fashion so that an end portion which is situated to face the front of the vehicle is situated in a lower position in a vertical direction.

Figure 2:
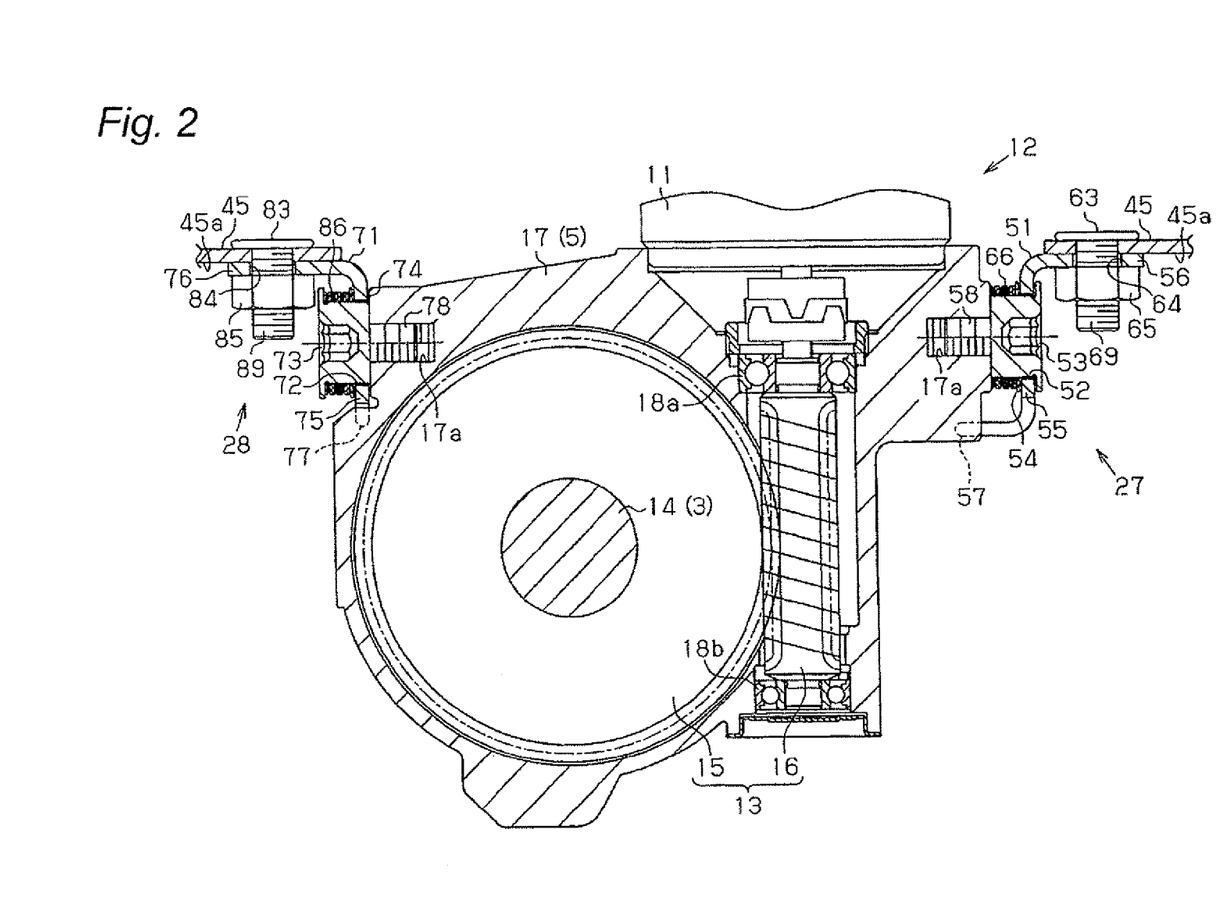
FIG. 2 is a sectional view taken along the line A-A in FIG. 1.

In addition, the steering system 1 is configured as a so-called column assist type electric power steering system (EPS) in which the column shaft 3 is driven to rotate by a motor which acts as a drive source. Specifically, as shown in FIGS. 1 and 2, the steering system 1 includes an EPS actuator 12 which imparts an assisting force to a steering system to assist in performing a steering operation by using a motor 11 as a drive source. The motor 11, which is the drive source of the EPS actuator 12, is connected to an output shaft 14 which makes up part of the column shaft 3 via a reduction gear mechanism 13 so as to drive the output shaft 14. Additionally, the reduction gear mechanism 13 is made up by meshing engagement of a worm wheel 15 which is connected to the output shaft 14 with a worm shaft 16 which is connected to the motor 11. Then, the reduction gear mechanism 13 and the output shaft 14 are accommodated in a housing 17 which makes up part of the steering column 5.

To describe this in detail, as shown in FIG. 2, the motor 11 is fixed to the housing 17 so that a motor shaft becomes at right angles to the output shaft 14. Additionally, the worm shaft 16 which is connected to the motor 11 is supported rotatably by bearings 18a, 18b which are provided within the housing 17 at both ends thereof and meshes with the worm wheel 15 which is connected to the output shaft 14. As shown in FIG. 1, the output shaft 14 is supported rotatably by bearings 19a to 19c which are provided within the housing 17. Additionally, the EPS actuator 12 is configured so as to impart the assisting force to the steering system by transmitting the rotation of the motor 11 to the output shaft 14 while reducing the revolution speed of the motor 11 by use of the reduction gear mechanism 13.

In addition, the steering system 1 has a telescoping function by which a longitudinal position of the steering wheel 6 (a steering wheel position in an axial direction of the steering shaft 2) can be adjusted. Specifically, the column shaft 3 of this embodiment includes a hollow primary shaft 21 to which the steering wheel 6 is fixed and which constitutes a steering wheel 6 side end portion of the column shaft 3 and a secondary shaft 22 which is spline fitted in the primary shaft 21 so as to move relative to the primary shaft 21 in the axial direction. Additionally, the column shaft 3 is made up by connecting the output shaft 14 to the secondary shaft 22 which is connected to the primary shaft 21. In addition, the output shaft 14 is made up by connecting together an upper shaft 14a which is connected to the secondary shaft and a lower shaft 14b to which the worm wheel 15 is fixed and which is connected to the intermediate shaft via a torsion bar 14c.

On the other hand, the steering column 5 of this embodiment includes an outer tube 24 which accommodates the primary shaft 21 in a supporting fashion via a bearing 23 and an inner tube 25 which accommodates the secondary shaft 22. The outer tube 24 is provided so as to slide relative to the inner tube 25 in the axial direction by the inner tube 25 being inserted in an inner circumference of the outer tube 24. Then, the steering column 5 is made up by connecting the housing 17 which accommodates the EPS actuator 12 to the inner tube 25 which is connected to the outer tube 24. In the steering system 1 that is configured as has been described heretofore, the steering wheel position can be adjusted in the axial direction by moving the outer tube 24 and the primary shaft 21 relative to the inner tube 25 and the secondary shaft 22.

Additionally, the steering system 1 has a tilt function which enables the adjustment of a height-wise position of the steering wheel 6 (a steering wheel position in a vertical direction of the vehicle). Specifically, as shown in FIGS. 1 to 3, the steering column 5 is supported so as to tilt relative to a vehicle body by an upper support mechanism 26 and a pair of first and second lower support mechanisms 27, 28, and by tilting the column shaft 3 together with the steering column 5 the steering wheel position can be adjusted in the vertical direction of the vehicle.

Figure 3:
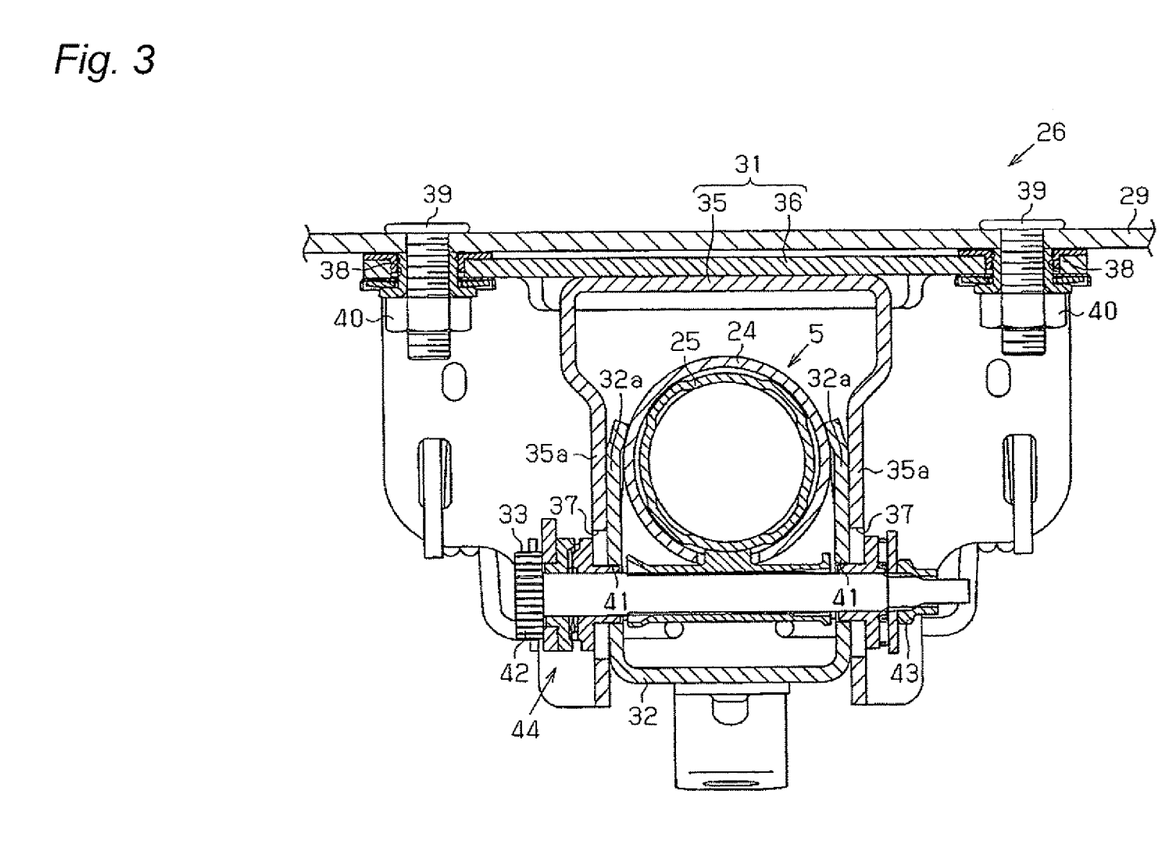
FIG. 3 is a sectional view taken along the line B-B in FIG. 1.

As shown in FIG. 3, the upper support mechanism 26 includes a body-side bracket 31 which is fixed to a fixed member 29 which is fixed to the vehicle body, a column-side bracket 32 which is fixed to the steering column 5 (the outer tube 24) and a pivot 33 which connects the body-side bracket 31 and the column-side bracket 32 together.

The body-side bracket 31 includes clamp 35 which is formed into a substantially U-shape as viewed in the axial direction of the steering shaft 2 and a flat plate 36 which is fixed to an upper end of the clamp 35. A substantially arc-shaped tilting elongated hole 37 is formed in each of a pair of side plate portions 35a which are provided on the clamp 35 so as to extend along a tilting direction of the steering column 5. This body-side bracket 31 is fastened to the fixed member 29 by a nut 40 being screwed on a fastening bolt 39 which is inserted through a fastening hole 38 in the plate 36.

The column-side bracket 32 is formed into a substantially U-shape as viewed in the axial direction of the steering shaft 2, and a telescoping elongated hole 41 which is long along the axial direction is formed in each of a pair of side plate portions 32a which are provided on the column-side bracket 32.

The pivot 33 is formed into a shaft-like shape, and a circular disc-shaped head portion 42 is formed on a proximal end side (a left side in FIG. 3) thereof. In addition, the pivot 33 is inserted through the tilting elongated hole 37 and the telescoping elongated hole 41 in such a state that the column-side bracket 32 is disposed inside the body-side bracket 31. Then, by a nut 43 being screwed on a distal end side (a right side in FIG. 3) of the pivot 33, the pivot 33 connects together the body-side bracket 31 and the column-side bracket 32. By so doing, the column-side bracket 32 can tilt about fulcrum bolts 53, 73 which are provided respectively in first and second lower support mechanisms 27, 28, which will be described later, relative to the body-side bracket 31 within a range defined by the tilting elongated hole 37 and can move along the axial direction of the column shaft 3 within a range defined by the telescoping elongated hole 41. Namely, the steering column 5 is supported by the upper support mechanism 26 so that the steering column 5 can tilt and move in the axial direction relative to the fixed member 29 within the ranges described above.

Additionally, a lock mechanism 44 adapted to hold the position of the steering wheel 6 as a result of manipulation of an operation lever, not shown, which rotates the pivot 33 so as to bring the side plate portions 32a, 35a into frictional engagement with each other is provided in the upper support mechanism 26.

As shown in FIG. 2, the first and second lower support mechanisms 27, 28 as the support mechanisms are disposed on both sides of the steering column 5 in a transverse direction (a horizontal direction in FIG. 2) of the vehicle. To describe this in detail, the first lower support mechanism 27 is disposed on a right-hand side of the steering column 5 so as to hold the worm shaft 16 between the column shaft 3 and itself, while the second lower support mechanism 28 is disposed on a left-hand side of the steering column 5.

The first and second lower support mechanisms 27, 28 include, respectively, support brackets 51, 71 which connect fixed members 45 which are fixed to the vehicle body with the steering column 5, the fulcrum bolts 53, 73 which are inserted respectively through shaft holes 52, 72 which are formed respectively in the support brackets 51, 71, and bushes 54, 74 which are interposed between the shaft holes 52, 72 and the fulcrum bolts 53, 73. The first and second lower support mechanisms 27, 28 are made up of similar members, and therefore, individual members of the first lower support mechanism 27 will be described, and individual members of the second lower support mechanism 28 will only be denoted by parenthesized reference numerals.

As shown in FIG. 2, the support bracket 51 (71) has a flat plate-shaped column-side fastened portion 55 (75) in which the shaft hole 52 (72) is formed and a body-side fastened portion 56 (76) which is extended from an end portion of the column-side fastened portion 55 (75) in a direction which is at right angles thereto and is thus formed into a substantially L-shape. Additionally, a restricting portion 57 (77) is formed at an end portion (a lower end portion in FIG. 2) of the column-side fastened portion 55 (75) which is opposite to the end portion which is contiguous with the body-side fastened portion 56 (76) so as to be spaced away in a longitudinal direction of the vehicle from the housing 17. Then, by the restricting portion 57 (77) being brought into engagement with the housing 17, the support bracket 51 (71) is restricted from rotating about the fulcrum bolt 53 (73) equal to or more than a predetermined range.

Figure 4:
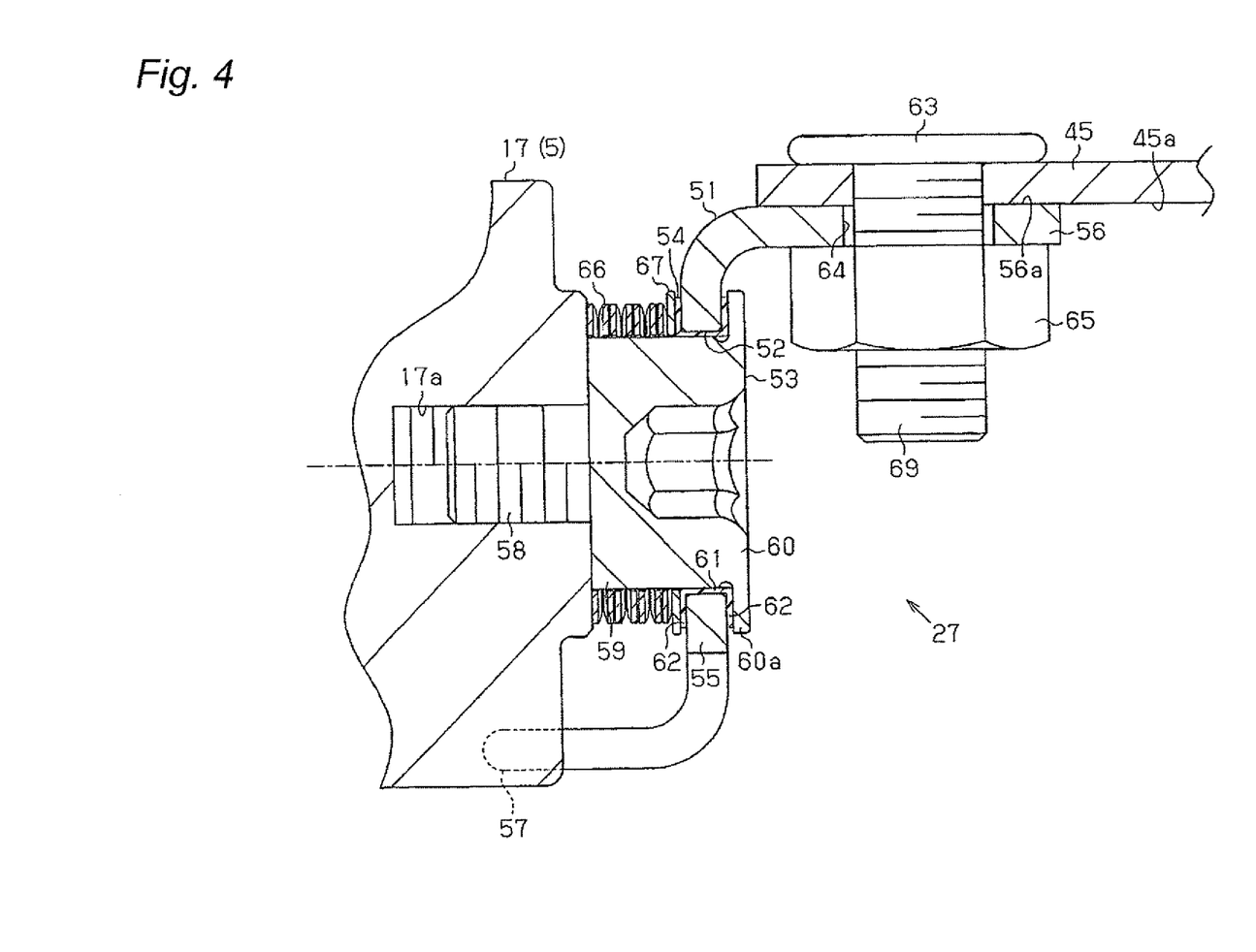
FIG. 4 is an enlarged sectional view of a portion which lies near a first lower support mechanism in the embodiment.

As shown in FIG. 4 (FIG. 5), the fulcrum bolt 53 (73) is made up of a threaded portion 58 (78) which is screwed into a threaded hole 17a which is formed in the housing 17, a shank portion 59 (79) on which the bush 54 (74) is fitted and a head portion 60 (80) which has an outside diameter larger than an inside diameter of the shaft hole 52 (72) so as to hold the column-side fastened portion 55 (75) between the steering column 5 and itself. The bush 54 (74) is made up of a round tubular portion 61 (81) through which the shank portion 59 (79) of the fulcrum bolt 53 (73) is inserted rotatably and annular flange portions 62 (82) which are extended radially outwards from both ends of the tubular portion 61 (81). In this embodiment, the bush 54 (74) is made up by coating a resin material having superior slidability on a metallic mesh which constitutes a base material of the bush 54.

As shown in FIG. 2, a fastening hole 64 (84) through which a fastening bolt 63 (83) which is fixed to the fixed member 45 is inserted is formed in the body-side fastened portion 56 (76). Then, the support bracket 51 (71) is fastened to the fixed member 45 by a nut 65 (85) being screwed on the fastening bolt 63 (83) which is inserted through the fastening hole 64 (84). Additionally, the support bracket 51 (71) is fastened to the steering column 5 by the fulcrum bolt 53 (73) which is inserted through the shaft hole 52 (72) being screwed into the threaded hole 17a in the housing 17 via the bush 54. By adopting this configuration, the steering column 5 is supported so as to tilt about the fulcrum bolt 53 (73) (as a tilt fulcrum) relative to the support bracket 51 (71) which is fixed to the vehicle body.

(Axial Force Reduction Suppression Construction)

Next, an axial force reduction suppression construction will be described which suppresses the reduction in axial force of the fastening bolt which fastens the support bracket to the fixed member.

There may be a situation in which when the fixed members 45 which are configured as having been described heretofore are offset from their normal positions (positions resulting when no machining error occurs) due to a machining accuracy or assembling accuracy, fastening surfaces 45a of the fixed members 45 which oppositely face the body-side fastened portions 56, 76 are not parallel to fastening surfaces 56a, 76a, which oppositely face the fixed members 45, of the body-side fastened portions 56, 76 which are in their normal positions (refer to FIG. 8). As this occurs, since the support brackets 51, 71 are deformed when the support brackets 51, 71 are fastened to the fixed members 45, the axial force of the fastening bolts 63, 83 are consumed, and the fastening force of the fastening bolts 63, 83 with which the support brackets 51, 71 are fastened to the fixed members 45 is weakened.

Taking this into consideration, as shown in FIG. 2, the first and second lower support mechanisms 27, 28 include coil springs 66, 86, respectively, as elastic members which can be compressed in axial directions of the support bolts 53, 73 (in a horizontal direction in FIG. 2). In this embodiment, as the coil springs 66, 86, a so-called coiled wave spring is adopted in which a strip-like spring material is wound into a coil-like shape and is curved into a continuous wave form along a longitudinal direction of the spring member. Then, the first and second lower support mechanisms 27, 28 are configured so that the individual support brackets 51, 71 are allowed to oscillate relative to the steering column 5 by the coil springs 66, 86 being compressed.

To described this in detail, as shown in FIG. 4, the coil spring 66 of the first lower support mechanism 27 is disposed on a steering column 5 side of the column-side fastened portion 55 and is held between the column-side fastened portion 55 and the steering column 5 in such a state that the coil spring 66 is mounted on the shank portion 59. Additionally, an annular space 67 is interposed between the flange portion 62 of the bush 54 and the coil spring 66.

Figure 5:
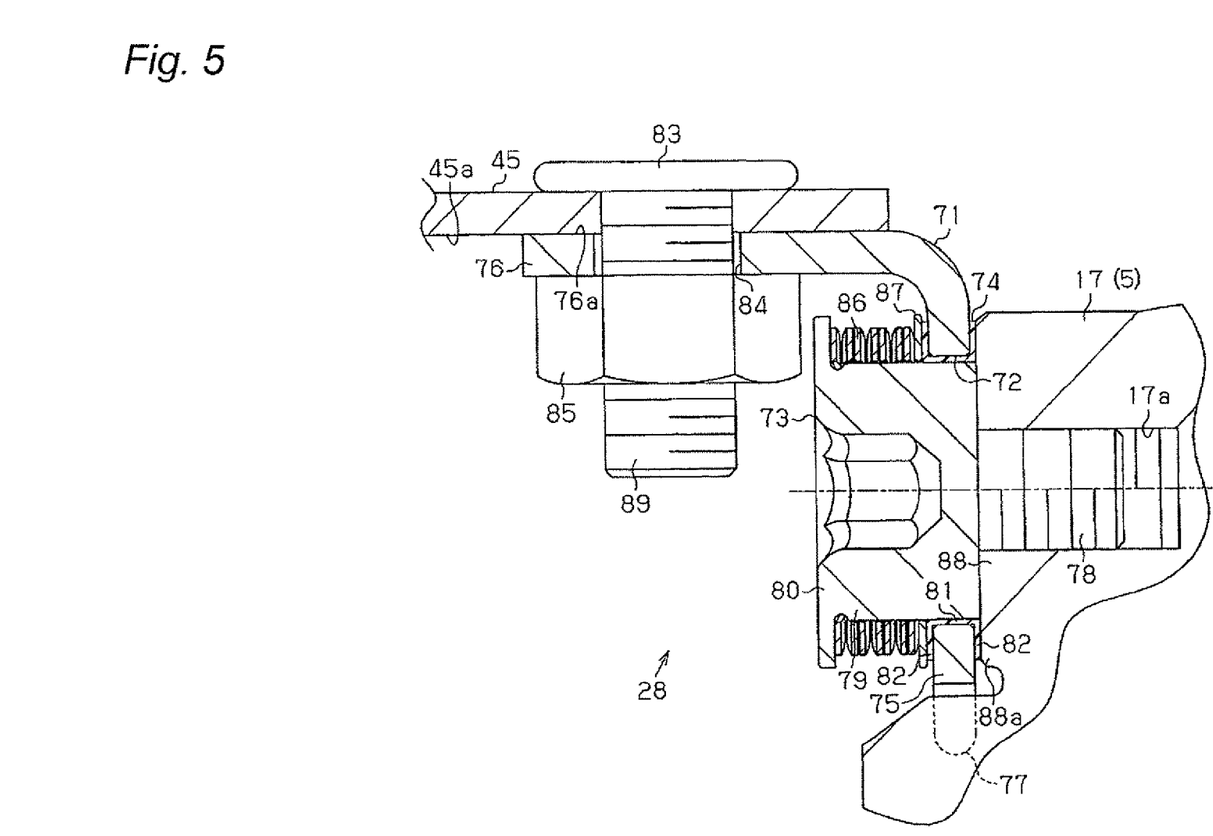
FIG. 5 is an enlarged sectional view of a portion which lies near a second lower support mechanism in the embodiment.

On the other hand, as shown in FIG. 5, the coil spring 86 of the second lower support mechanism 28 is disposed on a side of the column-side fastened portion 75 which lies opposite to a side thereof which faces the steering column 5 and is held between the column-side fastened portion 75 and the head portion 80 of the fulcrum bolt 73 in such a state that the coil spring 86 is mounted on the shank portion 79. Additionally, an annular spacer 87 is interposed between the flange portion 82 of the bush 74 and the coil spring 86. A set load is set individually on the coil springs 66, 86 which is good enough to suppress the looseness of the steering column 5 when a reverse input is applied to the coil springs 66, 86. By adopting this configuration, the steering column 5 is biased towards the second lower support mechanism 28 by the coil spring 66 and is biased towards the second lower support mechanism 28 via the fulcrum bolt 73 by the coil spring 86, whereby the steering column 5 is pressed against the support bracket 71 which is provided on the second lower support mechanism 28.

As shown in FIG. 4, the flange portion 62 of the bush 54 is held between the column-side fastened portion 55 and the head portion 60 of the fulcrum bolt 53. Namely, in this embodiment, the head portion 60 corresponds to an oppositely facing portion which oppositely faces the column-side fastened portion 55. The head portion 60 is formed so as not to project further in a direction which is at right angles to an axial direction of the fulcrum bolt 53 than the column-side fastened portion 55. Then, the flange portion 62 is formed so as not to project from the head portion 60 in the direction which is at right angles to the axial direction of the fulcrum bolt 53. Namely, an outside diameter of the flange portion 62 is formed smaller than an outside diameter of the head portion 60.

On the other hand, as shown in FIG. 5, the flange portion 82 of the bush 74 is held between the column-side fastened portion 75 and a projecting portion 88 as an oppositely facing portion which is formed on the steering column 5. The projecting portion 88 is formed into an annular shape which is disposed concentrically with the threaded hole 17a and is formed so as not to project in a direction which is at right angles to an axial direction of the fulcrum bolt 73 than the column-side fastened portion 75. Additionally, the flange portion 82 is formed so as not to project from the projecting portion 88 in the direction which is at right angles to the axial direction of the fulcrum bolt 73. Namely, an outside diameter of the flange portion 82 is formed smaller than an outside diameter of the projecting portion 88.

Additionally, as shown in FIG. 2, inside diameters of the fastening holes 64, 84 are formed larger than outside diameters of the respective threaded portions 69, 89 of the fastening bolts 63, 83. In addition, in this embodiment, the inside diameter of the fastening hole 64 in the support bracket 51 is formed larger than the inside diameter of the fastening hole 84 in the support bracket 71.

Further, the support bracket 51 is formed so that the movement of the fulcrum bolt 53 in a direction in which the fulcrum bolt 53 is screwed off (a rightward direction in FIG. 4) is restricted by the fastening bolt 63. Specifically speaking, the shaft hole 52 is formed so that the fulcrum bolt 53 oppositely faces the fastening bolt 63 (the nut 65) in the axial direction of the fulcrum bolt 53, and the fastening hole 64 is formed so that a space defined between the head portion 60 of the fulcrum bolt 53 and the nut 65 which is screwed on the fastening bolt 63 becomes shorter than a length of the threaded portion 58. By adopting this configuration, the fulcrum bolt 53 comes into abutment with the nut 65 to thereby be restricted from moving in the direction in which the fulcrum bolt 53 is screwed off. Similarly, the support bracket 71 is formed so that the movement of the fulcrum bolt 73 in a direction in which the fulcrum bolt 73 is screwed off (a leftward direction in FIG. 5) is restricted by the fastening bolt 83 (the nut 85).

Figure 6A:
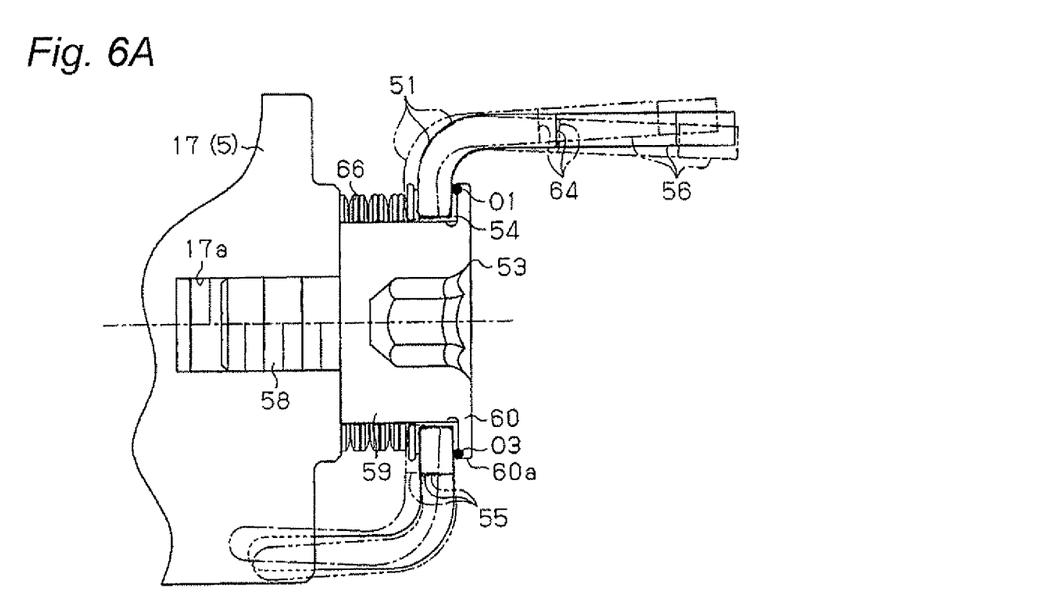
FIG. 6A shows an explanatory diagram which illustrates the function of the first lower support mechanism in the embodiment.
Figure 6B:
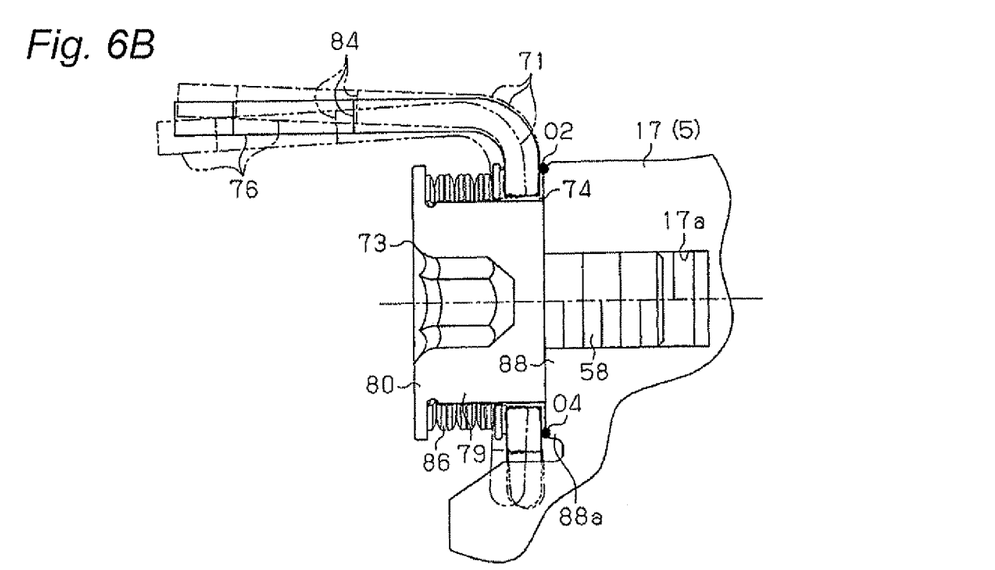
FIG. 6B shows an explanatory diagram which illustrates the function of the second lower support mechanism in the embodiment.

As shown in FIG. 6A, the first lower support mechanism 27 that is configured in the way described above is configured so that the support bracket 51 is allowed to oscillate relative to the steering column 5 by the coil spring 66 being compressed in the axial direction. Similarly, as shown in FIG. 6B, the second lower support mechanism 28 is configured so that the support bracket 71 is allowed to oscillate relative to the steering column 5 by the coil spring 86 being compressed in the axial direction. Additionally, as this occurs, only the tubular portions 61, 81 of the bushes 54, 74 are deformed between the fulcrum bolts 53, 73 and the column-side fastened portions 55, 75, while the flange portions 62, 82 are prevented from being deformed. Additionally, in FIGS. 6A and 6B, in a plane which is at right angles to the fastening surfaces 56a, 76a of the body-side fastened portions 56, 76, oscillations of the support brackets 51, 71 about contact points with the head portions 60, 80 of the fulcrum bolts 53, 73 which lie on sides of the column-side fastened portions 55, 75 which are contiguous with the body-side fastened portions 56, 76 as fulcrums O1, O2 are indicated by alternate long and short dash lines, while oscillations of the support brackets 51, 71 about contact points with the head portions 60, 80 of the fulcrum bolts 53, 73 which lie on sides of the column-side fastened portions 55, 75 which are opposite to the sides thereof which are contiguous with the body-side fastened portions 56, 76 as fulcrums O3, O4 are indicated by chain double-dashed lines.

Thus, as has been described heretofore, according to the embodiment, the following performs and advantages can be provided.

(1) The pair of first and second lower support mechanisms 27, 28 include the coil springs 66, 86, respectively, which can be compressed in the axial directions of the fulcrum bolts 53, 73, and the support brackets 51, 71 are allowed to oscillate relative to the steering column 5 by the coil springs 66, 86 being compressed.

According to the configuration described above, even when the fastening surfaces 45a of the fixed members 45 are offset from their normal positions due to the machining accuracy thereof, in fastening the support brackets 51, 71 to the fixed members 45, the support brackets 51, 71 oscillate by the coil springs 66, 86 being compressed in the axial directions so that the fastening surfaces 56a, 76a of the body-side fastened portions 56, 76 are closely attached to the fastening surfaces 45a of the fixed members 45. Therefore, the deformation of the support brackets 51, 71 can be suppressed. Additionally, as this occurs, since the coil springs 66, 86 are compressed in the axial directions, the support brackets 51, 71 are allowed to oscillate without deforming the flange portions 62, 82 of the tubular portions 61, 81 of the bushes 54, 74 as done in the related art. Consequently, it is possible to suppress the reduction in axial force of the fastening bolts 63, 83, whereby the design which allows for the reduction in axial force is no more necessary, thereby making it possible to realize a reduction in cost.

(2) The coil spring 66 of the first lower support mechanism 27 is disposed on the steering column 5 side of the column-side fastened portion 55, while the coil spring 86 of the second lower support mechanism 28 is disposed on the side of the column-side fastened portion 75 which is opposite to the side thereof which faces the steering column 5.

According to the configuration described above, the steering column 5 is pressed towards the support bracket 71 which is provided on the second lower support mechanism 28. Because of this, even in the event that the respective members that make up the first and second support mechanisms 27, 28 wear as a result of use over a long period of time to produce an axial gap between the steering column 5 and each of the support brackets 51, 71, the looseness of the steering column 5 can be suppressed.

(3) Since the inside diameters of the fastening holes 64, 84 are formed larger than the outside diameters of the threaded portions 69, 89 of the fastening bolts 63, 83, even in the event that the positions of the fastening holes 64, 84 are changed due to the oscillation of the support brackets 51, 71, the body-side fastened portions 56, 76 can easily be fastened to the fixed members 45.

(4) The inside diameter of the fastening hole 64 formed in the support bracket 51 is formed larger than the inside diameter of the fastening hole 84 formed in the support bracket 71. According to this configuration, the assembling position of the steering column 5 (the steering wheel 6) to the vehicle body is determined based on the position of the fastening hole 84 in the support bracket 71.

Here, in the first lower support mechanism 27, since the coil spring 66 is interposed between the support bracket 51 and the steering column 5, the steering column 5 is pressed against the head portion 60 of the fulcrum bolt 53 while being spaced away from the steering column 5. Because of this, the relative position of the support bracket 51 to the steering column 5 is affected by the dimensional accuracy of the fulcrum bolt 53. in contrast to this, in the second lower support mechanism 28, since the steering column 5 is pressed towards the support bracket 71 as has been described before, the relative position of the support bracket 71 to the steering column 5 is not affected by the dimensional accuracy of the fulcrum bolt 73. Additionally, as shown in FIG. 2, since the first lower support mechanism 27 is disposed on the right-hand side of the steering column 5 so as to hold the worm shaft 16 between the column shaft 3 and itself, the distance between the support bracket 51 and the column shaft 3 becomes large, compared with the support bracket 71.

Consequently, since the relative position of the support bracket 71 to the steering column 5 is made difficult to vary compared with the support bracket 51, the accuracy of the assembling position where the steering column 5 is assembled to the vehicle body can easily be increased.

(5) The flange portion 62 is formed on the bush 54 which is held between the column-side fastened portion 55 and the head portion 60 of the fulcrum bolt 53, and the flange portion 62 is formed so as not to project further in the direction which is at right angles to the axial direction of the fulcrum bolt 53 than the head portion 60. Additionally, the flange portion 82 is formed on the bush 74 which is held between the column-side fastened portion 75 and the projecting portion 88 of the steering column 5, and the flange portion 82 is formed so as not to project further in the direction which is at right angles to the axial direction of the fulcrum bolt 73 than the projecting portion 88. According to this configuration, when the support brackets 51, 71 oscillate, an outer circumferential edge 60a, 88a of the head portion 60 or the projecting portion 88 can be prevented from biting into the flange portions 62, 82, and the application of an excessive load to the flange portions 62, 82 can be suppressed.

(6) The support brackets 51, 71 are formed so that the movement of the fulcrum bolts 53, 73 in the direction in which the fulcrum bolts 53, 73 are screwed off is restricted by the fastening bolts 63, 83, and therefore, even in the event that the fulcrum bolts 53, 73 are loosened due to the steering column 5 being tilted repeatedly, it is possible to prevent the fulcrum bolts 53, 73 from being screwed off to fall.

In addition, the embodiment can also be carried out in the following modes where the embodiment is modified as required.

Figure 7:
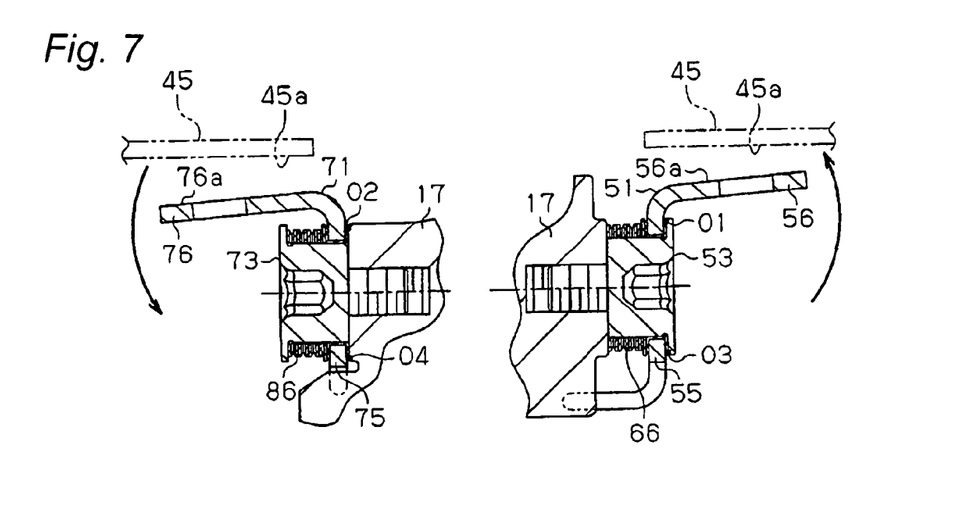
FIG. 7 shows enlarged sectional views of another first lower support mechanism and another second lower support mechanism.

In the embodiment, the support brackets 51, 71 are formed so that the fastening surfaces 56a, 76a of the body-side fastened portions 56, 76 become parallel to the fastening surfaces 45a of the fixed members 45 which are situated in their normal positions. However, the invention is not limited to this, and hence, as shown in FIG. 7, the fastening surfaces 56a, 76a of the body-side fastened portions 56, 76 may be inclined in a direction in which the support brackets 51, 71 oscillate about the fulcrums O3, O4 relative to the fastening surfaces 45a of the fixed members 45 which are in their normal positions within a plane which is at right angles to the fastening surfaces 56a, 76a. It should be noted that in FIG. 7, the fixed members 45 which are provided in the normal positions are indicated by chain double-dashed lines and directions in which the support brackets 51, 71 oscillate about the fulcrums O3, O4 are indicated by thick arrows.

Here, where the support brackets 51, 71 oscillate about the fulcrums O3, O4 which are situated on the opposite side to the body-side fastened portions 56, 76 (refer to the chain double-dashed lines in FIGS. 6A and 6B) in the plane which is at right angles to the fastening surfaces 56a, 76a, compared with where the support brackets 51, 71 oscillate about the fulcrums O1, O2 which lie to face the body-side fastened portions 56, 76 (refer to the alternate long and short dash lines in FIGS. 6A and 6B), the positions of the fastening holes 64, 84 which are formed in the body-side fastened portions 56, 76, respectively, are changed largely. In this respect, in the configuration shown in FIG. 7, since the body-side fastened portions 56, 76 are formed so as to be inclined in the direction in which the support brackets 51, 71 oscillate about the fulcrums O3, O4, in fastening the support brackets 51, 71 to the fixed members 45, the oscillation of the support brackets 51, 71 about the fulcrums O3, O4 can be reduced. This can suppress the occurrence of a situation in which the positions of the fastening holes 64, 84 are offset largely due to the oscillation of the support brackets 51, 71, making difficult the assemblage of the steering column 5.

In the embodiment, while the fastening holes 64, 84 are formed larger than the outside diameters of the threaded portions 69, 89 of the fastening bolts 63, 83, the invention is not limited thereto. The fastening holes 64, 84 may be formed substantially equal to the outside diameters of the threaded portions 69, 89. Additionally, the inside diameter of the fastening hole 64 in the support bracket 51 may be formed substantially equal to the inside diameter of the fastening hole 84 in the support bracket 71.

In the embodiment, the coil spring 66 of the first lower support mechanism 27 is disposed on the steering column 5 side of the column-side fastened portion 55, while the coil spring 86 of the second lower support mechanism 28 is disposed on the side of the column-side fastened portion 75 which is opposite to the side thereof which faces the steering column 5. However, the invention is not limited thereto, and hence, the coil spring 66 may be disposed on a side of the column-side fastened portion 55 which is opposite to the side thereof which faces the steering column 5, while the coil spring 86 may be disposed on a steering column 5 side of the column-side fastened portion 75. Additionally, both of the coil springs 66, 86 may be disposed on the steering column 5 sides of the column-side fastened portions 55, 75 or may be disposed on the sides of the column-side fastened portions 55, 75 which are opposite to the sides thereof which face the steering column 5.

In the embodiment, the column-side fastened portions 55, 75 are fastened to the steering column 5 by the fulcrum bolts 53, 73 which are inserted through the column-side fastened portions 55, 75 and into the steering column 5 from both the sides thereof in the transverse direction of the vehicle. However, the invention is not limited thereto, and hence, a configuration may be adopted in which the fulcrum bolts 53, 73 are provided so that threaded portions 58, 78 of the fulcrum bolts 53, 73 project from the inside to the outside of the steering column 5 through both the sides of the steering column 5 in the transverse direction of the vehicle and nuts are screwed on the threaded portions 58, 78 so as to fasten the column-side fastened portions 55, 75 to the steering column 5.

In the embodiment, the flange portion 62 of the bush 54 is formed so as not to project further in the direction which is at right angles to the axial direction of the fulcrum bolt 53 than the head portion 60, and the flange portion 82 of the bush 74 is formed so as not to project further in the direction which is at right angles to the axial direction of the fulcrum bolt 73 than the projecting portion 88. However, the invention is not limited thereto, and hence, part or the whole of the flange portion 62 may be formed so as to project further in the direction which is at right angles to the axial direction than the head portion 60, while part or the whole of the flange portion 82 may be formed so as to project further in the direction which is at right angles to the axial direction than the projecting portion 88. Additionally, no flange portions 62, 82 may be formed on the bushes 54, 74.

In the embodiment, while the support brackets 51, 71 are formed so that the movement of the fulcrum bolts 53, 73 in the direction in which the fulcrum bolts 53, 73 are screwed off is restricted by the fulcrum bolts 53, 73 being brought into abutment with the nuts 65, 85 which are screwed on the fastening bolts 63, 83, the invention is not limited thereto. The support brackets 51, 71 may be formed so that the movement of the fulcrum bolts 53, 73 in the direction described above is restricted by the fulcrum bolts 53, 73 being brought into abutment with the threaded portions 69, 89 of the fastening bolts 63, 83. Additionally, the support brackets 51, 71 may be formed so that the movement of the fulcrum bolts 53, 73 in the direction in which the fulcrum bolts 53, 73 are screwed off is not restricted by the fastening bolts 63, 83.

In the embodiment, while the support brackets 51, 71 are formed so that the body-side fastened portions 56, 76 extend from the column-side fastened portions 55, 75 in the direction which is at right angles to the latter fastened portions, the invention is not limited thereto, and hence, the support brackets 51, 71 may be formed so that the body-side fastened portions 56, 76 extend from the column-side fastened portions 55, 75 in a sloping direction relative to the latter fastened portions according to the normal positions of the fixed members 45.

In the embodiment, while the bushes 54, 74 are made up by coating the resin material on the metallic mesh which constitutes the base material of the bushes 54, 74, the invention is not limited thereto, and hence, the bushes 54, 74 may be made of a resin material only. Additionally, as long as the support brackets 51, 71 are allowed to oscillate, the bushes 54, 74 may be made of other materials than resin materials.

In the embodiment, while the elastic members are made up of the coil springs (the coiled wave springs) 66, 86, the invention is not limited thereto, and hence, the elastic members may be made up of other spring members. Additionally, in addition to the spring members, the elastic members may be made up of elastic bodies of rubber, provided that the elastic bodies can be compressed in the axial direction.

In the embodiment, while the invention is described as being applied to the steering system having the tilt function and the telescoping function, the invention is not limited thereto, and hence, the invention may be applied to a steering system having only a tilting adjustment function.

In the embodiment, the steering system 1 is configured as the so-called column assist type electric power steering system (EPS) in which the assist force is imparted to the output shaft 14 which makes up the column shaft 3. However, the invention is not limited thereto, and hence, the invention may be applied to other EPS or hydraulic power steering systems than those of the column assist type such as, for example, a so-called rack assist type EPS or hydraulic power steering system or may be applied to a non-assist type steering system.

While the invention has been described in detail and by reference to the specific embodiment, it is obvious to those skilled in the art to which the invention pertains that various alterations or modifications can be made to the embodiment without departing from the spirit and scope of the invention.

This patent application is based on Japanese Patent Application (No. 2011-001470) filed on Jan. 6, 2011, the contents of which are incorporated herein by reference.

INDUSTRIAL APPLICABILITY

According to the invention, the steering system can be provided which can suppress the reduction in axial force of the fastening bolts.

REFERENCE SIGNS LIST

1 Steering system
2 Steering shaft
5 Steering column
6 Steering wheel
29, 45 Fixed member
45a, 56a, 76a Fastening surface
51, 71 Support bracket
52, 72 Shaft hole
53, 73 Fulcrum bolt
54, 74 Bush
55, 75 Column-side fastened portion
56, 76 Body-side fastened portion
57, 77 Restricting portion
58, 78 Threaded portion
59, 79 Shank portion
60, 80 Head portion
61, 81 Tubular portion
62, 82 Flange portion
63, 83 Fastening bolt
64, 84 Fastening hole
65, 85 Nut
66, 86 Coil spring
67, 87 Spacer
69, 89 Threaded portion
88 Projecting portion
O1, O2, O3, O4 Fulcrum

The invention claimed is:

1. A steering system, comprising a steering column which supports rotatably a steering shaft to which a steering wheel is connected and a pair of support mechanisms which support the steering column so as to tilt relative to a vehicle body,
each of the support mechanisms including:
a support bracket having a column-side fastened portion which is fastened to the steering column so as to tilt and a body-side fastened portion which is fastened to a fixed member which is fixed to the vehicle body;
a fulcrum bolt which is inserted through a shaft hole formed in the column-side fastened portion, which performs as a fulcrum when the steering column tilts, and which is used to fasten the column-side fastened portion to the steering column; and a bush which is interposed between the fulcrum bolt and the shaft hole, wherein a fastening hole through which a fastening bolt is inserted to fasten the support bracket to the fixed member is formed in the body-side fastened portion, and each of the support mechanisms comprises an elastic member which can be compressed in an axial direction of the fulcrum bolt, and the support bracket is configured to oscillate relative to the steering column by the elastic member being compressed.

2. The steering system as set forth in claim 1, wherein the elastic member which is provided on either of the support mechanisms is disposed on a side of the steering column with respect to the column-side fastened portion, and the elastic member which is provided on the other of the support mechanisms is disposed on a side opposite to the steering column with respect to the column-side fastened portion.

3. The steering system as set forth in claim 1, wherein an inside diameter of the fastening hole is formed larger than an outside diameter of a threaded portion of the fastening bolt.

4. The steering system as set forth in claim 2, wherein an inside diameter of a fastening hole formed in the support bracket which is provided on either of the support mechanisms is formed larger than an inside diameter of a fastening hole formed in the support bracket which is provided on the other of the support mechanisms.

5. The steering system as set forth in claim 1, wherein a fastening surface of the body-side fastened portion which oppositely faces the fixed member is formed in a sloping fashion relative to a direction in which the support bracket oscillates about a side opposite to the body-side fastened portion with respect to the column-side fastened portion as a fulcrum relative to a fastening surface of the fixed member which oppositely faces the body-side fastened column, in a plane which is at right angles to the fastening surface.

6. The steering system as set forth in claim 1, wherein the bush has a round tubular portion and a flange portion which is extended radially outwards from the tubular portion, the flange portion is held between the column-side fastened portion and an oppositely facing portion which oppositely faces the column-side fastened portion in the axial direction, the oppositely facing portion is formed so as not to project further in a direction which is at right angles to the axial direction than the column-side fastened portion, and the flange portion is formed so as not to project further in the direction which is at right angles to the axial direction than the oppositely facing portion.

7. The steering system as set forth in claim 1, wherein the support bracket is formed so that a movement of the fulcrum bolt in a direction in which the fulcrum bolt is screwed off is restricted by the fastening bolt.

\* \* \* \* \*